United States Patent [19]
Ohtsuki

[11] Patent Number: 5,654,760
[45] Date of Patent: Aug. 5, 1997

[54] SELECTION OF QUANTIZATION STEP SIZE IN ACCORDANCE WITH PREDICTED QUANTIZATION NOISE

[75] Inventor: Tomoyuki Ohtsuki, Chiba, Japan

[73] Assignee: Sony Corporation, Tokyo, Japan

[21] Appl. No.: 410,721

[22] Filed: Mar. 27, 1995

[30] Foreign Application Priority Data

Mar. 30, 1994 [JP] Japan ..................... 6-084088

[51] Int. Cl.[6] ..................... H04N 7/12; H04N 11/02; H04N 11/04
[52] U.S. Cl. ................. 348/405; 386/111; 341/200; 375/243; 348/404; 348/419; 382/251
[58] Field of Search ..................... 348/404, 405, 348/419; 382/251; 341/200, 138, 51; 375/243, 249; H04N 7/32, 7/30

[56] References Cited

U.S. PATENT DOCUMENTS

| | | | |
|---|---|---|---|
| 4,774,574 | 9/1988 | Daly et al. | |
| 4,776,030 | 10/1988 | Tzou | |
| 5,144,423 | 9/1992 | Knauer et al. | 358/133 |
| 5,412,484 | 5/1995 | Yoshikawa | 358/433 |
| 5,444,487 | 8/1995 | Kondo et al. | 348/405 |
| 5,475,433 | 12/1995 | Jeong | 348/419 |
| 5,491,761 | 2/1996 | Kim | 382/251 |
| 5,526,052 | 6/1996 | Ar | 348/405 |
| 5,542,008 | 7/1996 | Sugahara et al. | 382/248 |

FOREIGN PATENT DOCUMENTS

| | | |
|---|---|---|
| 0490539 | 6/1992 | European Pat. Off. . |
| 0493136 | 7/1992 | European Pat. Off. . |
| 0509576 | 10/1992 | European Pat. Off. . |
| 0675663 | 10/1995 | European Pat. Off. . |

OTHER PUBLICATIONS

Dedes, Ioannis; Variable Bit Rate Adapive Predictive Coder, Ieee, pp. 511–517 Mar 1992.
Onyszchuk, Quantization Loss in Convolutional Decoding, Ieee, pp. 261–265 Nov. 1990.
Gonzales; Nonparametric Rank Detectors on Quantized Radar Video Signals, Ieee, pp. 969–975 Nov. 1990.

*Primary Examiner*—Tommy P. Chin
*Assistant Examiner*—David R. Vincent
*Attorney, Agent, or Firm*—William S. Frommer; Alvin Sinderbrand

[57] ABSTRACT

A video image encoder estimates a quantization noise curve which will result from quantizing a coefficient data block and uses the estimated quantization noise curve and a specified minimum noise value to select the quantization step size actually used to quantize the coefficient data block. The quantization step size is also selected as a function of transmission buffer occupancy so as to limit the amount of encoded data to a predetermined rate.

19 Claims, 10 Drawing Sheets

Fig. 6

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

Fig. 7

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

19
SELECTION OF QUANTIZATION STEP SIZE IN ACCORDANCE WITH PREDICTED QUANTIZATION NOISE

BACKGROUND OF THE INVENTION

The present invention relates to image compression, and, more particularly, is directed to quantizing image data in accordance with a prediction of the noise introduced by the quantization.

The Moving Picture Experts Group system (MPEG 1, MPEG 2) has been proposed as an international standard for high efficiency encoding and decoding of a moving picture. Three types of pictures are defined in the MPEG system, an I picture which is encoded in a standalone manner, a P picture which is encoded by forward prediction from one reference picture which may be an I picture or a P picture, and a B picture which is bidirectionally encoded by forward and backward prediction from two reference pictures. A typical sequence of encoded pictures, in temporal order, may be I B B P B B P B B I B B . . . .

A picture is divided into macro blocks. An I picture comprises intra-macro blocks. P and B pictures respectively comprise non-intra macro blocks.

FIG. 1 shows a conventional video encoder according to the MPEG system. Blocks of data representing an I picture are applied to input terminal 100 and thence to subtractor 107. Since an I picture is not predicted from a reference picture, subtractor 107 simply forwards the I picture data blocks to DCT circuit 101 which orthogonally transforms the picture data blocks to coefficient data blocks, and supplies the blocks of coefficient data to quantizer 102.

Quantizer 102 quantizes the I picture coefficient data using a quantization step size selected by quantization control circuit 102. The quantization step size may also be referred to as a quantization scale. The quantized coefficient data are variable length encoded by VLC circuit 103, such as with a two dimensional Huffman code, and supplied to buffer 110. Buffer occupancy detecting circuit 117 monitors the percentage of buffer capacity used by the encoded data and supplies buffer occupancy information to the quantization control circuit 108, which selects a quantization-step size so that the amount of encoded data in the buffer 110 remains within its capacity, i.e., does not overflow. The encoded data is delivered to output terminal 114 for transmission or recording.

The quantized coefficient data are also supplied to inverse quantizing circuit 109, which dequantizes the quantized data to produce reconstructed coefficient data. Inverse DCT circuit 111 inverse orthogonally transforms the reconstructed coefficient data to produce reconstructed image data blocks and supplies the image data blocks to frame memory 105 for storage therein as a locally decoded reference picture.

Subsequently, blocks of data representing either a B picture or a P picture are applied to terminal 100 and thence to motion detecting circuit 104 which detects motion within the supplied data blocks and produces motion vectors between the input B or P picture blocks and the stored reference picture blocks. The motion vectors are supplied to motion compensating circuit 113. The reference picture stored in frame memory 105 is motion compensated, that is, modified using the motion vectors by the circuit 113, to produce predicted picture data which is applied to subtractor 107 and adder 112. Subtractor 107 subtracts the predicted picture data from the input picture data to produce difference data which is orthogonally transformed, quantized and variable length coded, as generally described above. The quantized input picture data are also supplied to inverse quantizing circuit 109 and inverse DCT circuit 111 to produce reconstructed difference data which are added to the image data of the motion compensated reference picture by adder 112. The result is stored in frame memory 105 as a new reference picture.

In the encoder of FIG. 1, in order to generate data from the buffer 110 at a predetermined rate, it is necessary to limit the amount of encoded data per predetermined period of time to a predetermined amount. The process of limiting operates so that when the amount of encoded data in the buffer 110 is large, the quantization step size is selected to be coarse, and when the amount of encoded data in the buffer 110 is small, the quantization step size is selected to be fine.

Increasing the quantization step size to be coarse decreases the amount of encoded data, and also degrades the quality of the reconstructed picture. For images having a lot of information, degradation in quality is a serious problem.

Decreasing the quantization step size to be fine increases the amount of encoded data, and also reduces degradation in the quality of the reconstructed picture. For images having little information, degradation in quality is not such a serious problem, and reduction in the amount of encoded data is desirable.

Thus, it is seen that to select the optimum quantization step size, it is necessary to consider picture quality as well as buffer occupancy.

OBJECTS AND SUMMARY OF THE INVENTION

Therefore, an object of the present invention is to provide an encoding apparatus and method which avoid the aforementioned disadvantages of the prior art.

It is another object of the present invention, to provide an encoding apparatus and method in which a quantization step size is set in consideration of picture quality.

A further object of the invention is to provide a quantization step size control method and apparatus which select a quantization step size in accordance with noise introduced by the quantization.

In accordance with an aspect of this invention, the foregoing objects are met by provision of a method of and a system for quantization control which estimates a quantization noise curve relating quantization noise to quantization step size for a block of image data, and selects an actual quantization step size in accordance with the estimated quantization noise curve.

According to a further aspect of the invention, the step of and means for estimating includes predicting a saturation noise value, predicting a saturation quantization step size corresponding to the saturated noise value, and predicting the estimated quantization noise curve in accordance with the saturation noise value and the saturation quantization step size.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 6 and 7 are quantization tables used in quantizing intra-macro blocks and non-intra macro blocks, respectively;

DETAILED DESCRIPTION OF THE PREFERRED EMBODIMENTS

In an encoder according to the present invention, a quantization noise curve which will result from quantizing a coefficient data block is estimated and used, along with a specified minimum noise value, to select the quantization step size actually used to quantize the coefficient data block. Consequently, since image quality is incorporated in the selection of the quantization step size, reconstructed pictures have better image quality.

Encoders according to the present invention and in accordance with the MPEG 2 system will now be described. It will be appreciated that encoders in accordance with other systems are also contemplated.

Figure 1:
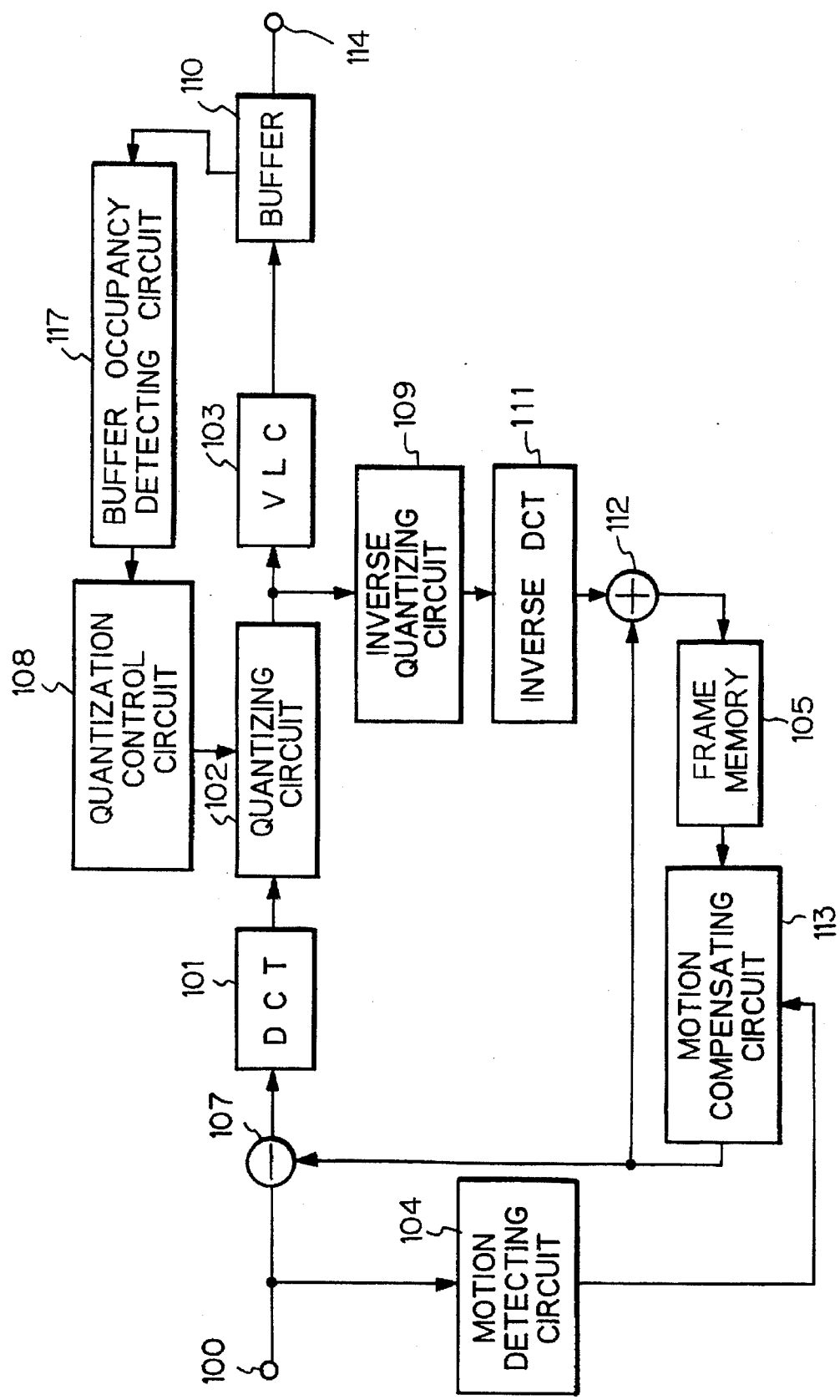
FIG. 1 is a block diagram of a conventional video image encoder.
Figure 2:
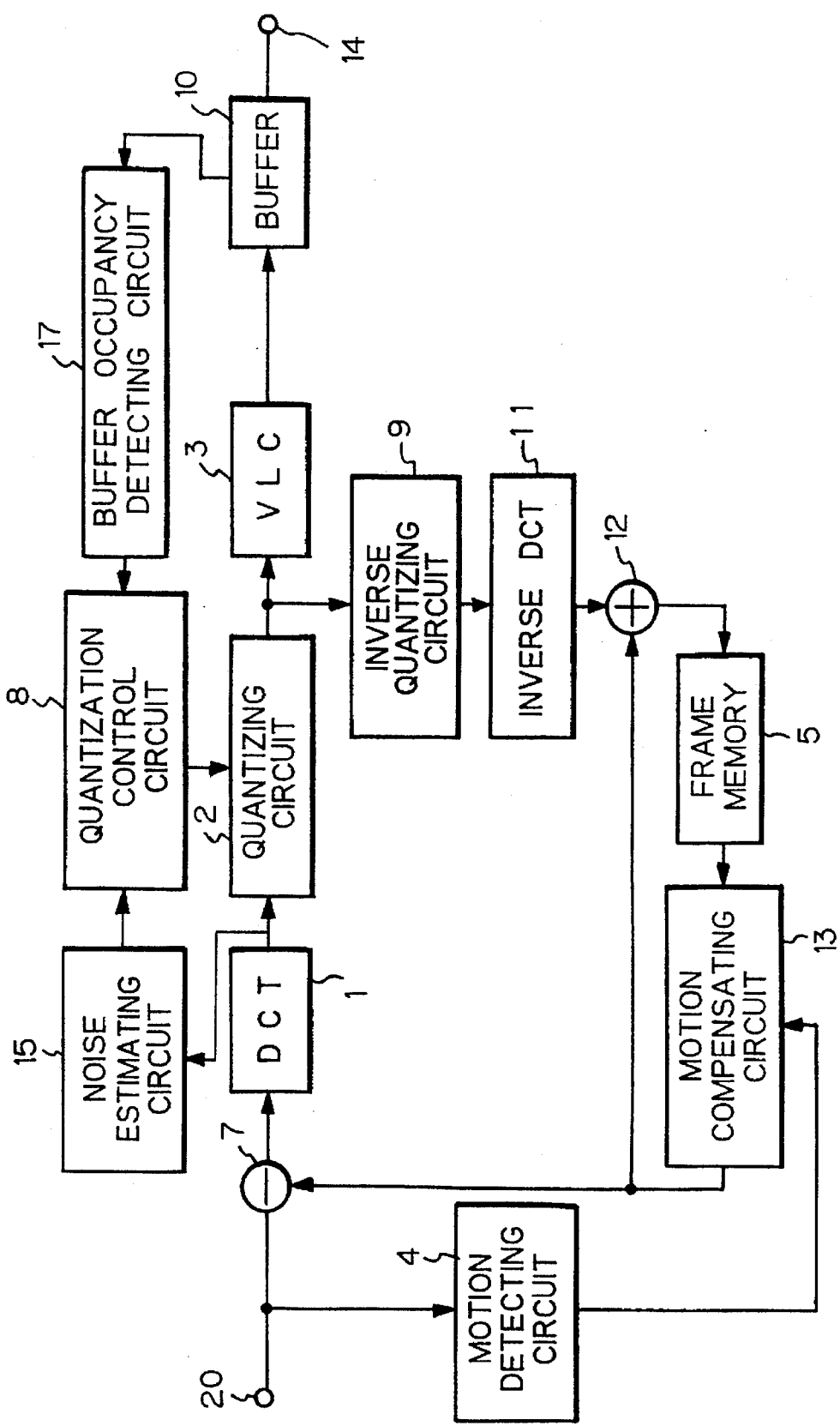
FIGS. 2 and 3 are block diagrams of video image encoders according to the present invention.

Referring now to the drawings, and in particular to FIG. 2, there is illustrated an encoder according to the present invention. The apparatus illustrated in FIG. 2 is similar to the apparatus illustrated in FIG. 1, but also includes noise estimating circuit 15. For brevity, descriptions of elements of FIG. 2 corresponding to elements of FIG. 1 are omitted.

The estimating circuit 15 of FIG. 2 is adapted to receive a block of coefficient data from DCT circuit 1, to estimate the noise at various quantization step sizes, as described below, and to supply a predicted noise curve to quantization control circuit 8. In other embodiments, instead of estimating quantization noise from coefficient data, a quantization noise estimate may be generated directly from the input image data.

The quantization control circuit 8 functions to select a quantization step size on the basis of the predicted noise curve and the occupancy of buffer 10. The buffer occupancy is fed back to the quantization control circuit 8 by buffer occupancy detecting circuit 17.

Figure 3:
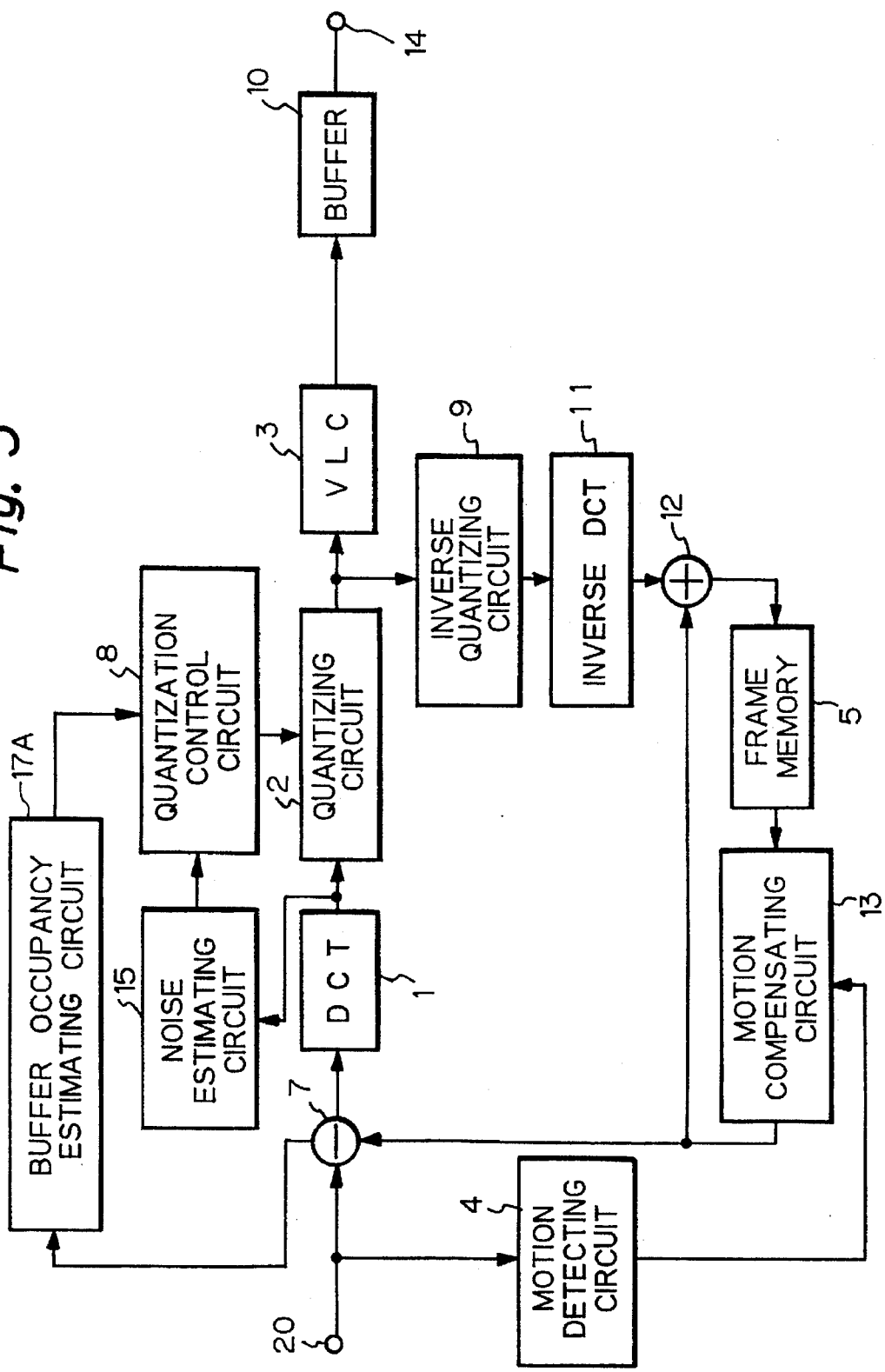

FIG. 3 illustrates another embodiment of an encoder according to the present invention. In the encoder of FIG. 3, instead of feeding back the actual buffer occupancy, buffer occupancy estimating circuit 17A functions to predict the buffer occupancy from the input image data, and to feed forward the predicted buffer occupancy to the quantization control circuit 8.

Figure 4:
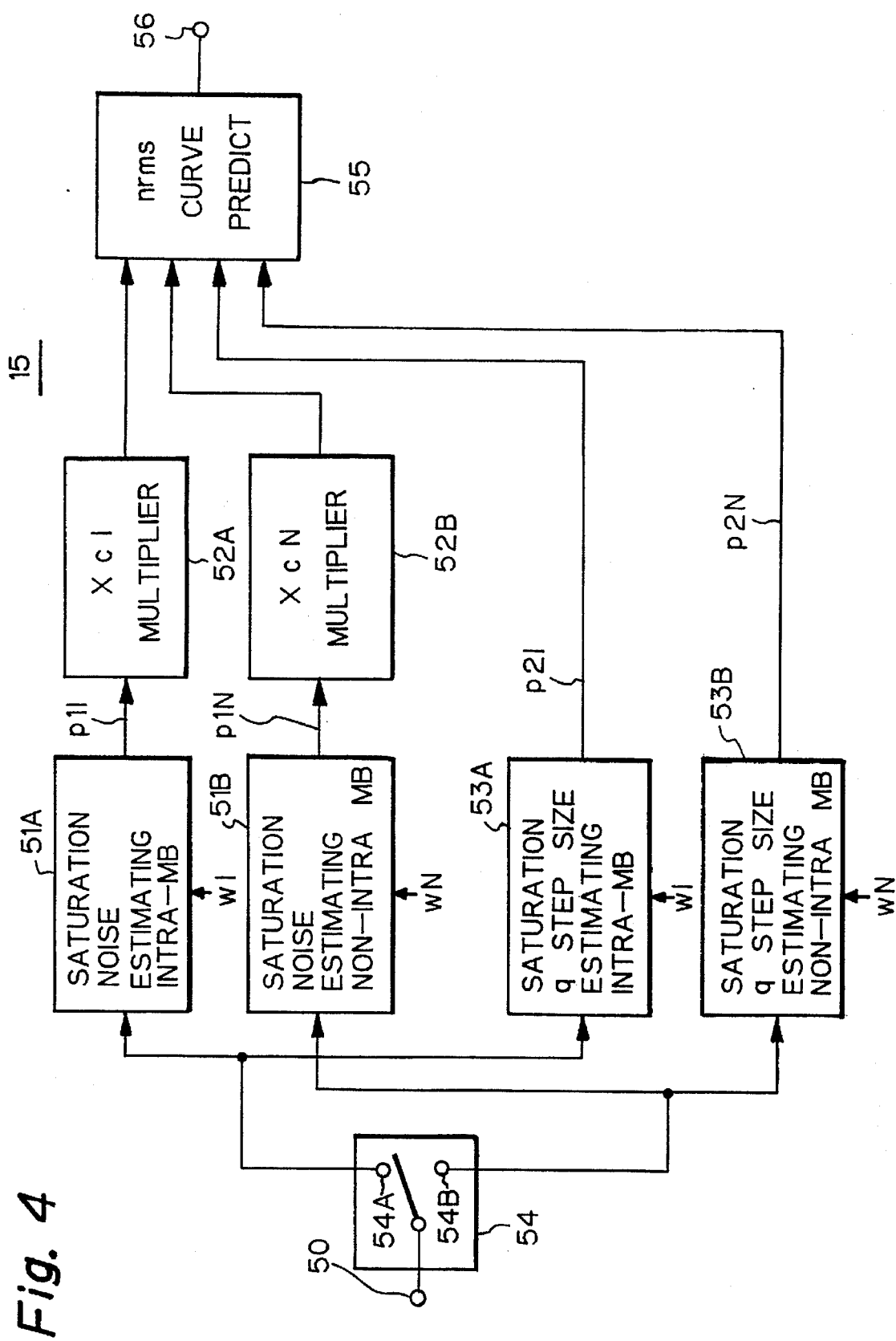
FIG. 4 is a block diagram of a noise estimating circuit according to the present invention.

FIG. 4 shows a block diagram of the noise estimating circuit 15. Generally, a coefficient block is supplied to a saturation noise estimating circuit and to a saturation quantization step size estimating circuit. The function of these estimating circuits is discussed below. A noise characteristic estimating circuit uses the estimated saturation noise and estimated saturation quantization step size to produce a predicted noise curve. The actual noise detecting circuit may be realized in hardware or in software.

FIGS. 6 and 7 show quantization matrices used in the MPEG encoder of FIG. 2 for intra-macro block and non-intra-macro block coefficients, respectively. The matrix of FIG. 6 is referred to as wI(i,j), and the matrix of FIG. 7 is referred to as wN(i,J).

QUANTIZATION NOISE

Noise introduced by quantization of coefficient blocks will now be discussed.

The following mathematical symbol conventions are used herein:

| | |
|---|---|
| / | Division of an integer and rounding (omission) of the fractional portion in the direction of 0. |
| // | Division of an integer and rounding of the fractional portion to the nearest integer. A fractional portion of 0.5 is rounded away from 0. |
| % | Value of the remainder of division of integers. |
| sign(ARG) | If ARG is a positive number, sign(ARG) = 1. If ARG is zero, sign(ARG) = 0. If ARG is a negative number, sign(ARG) = –1. |

Quantization of a coefficient comprises division by quantization step size and rounding of the result to an integer, and is described by the following equation:

$$Q\_COEF = COEF \mathbin{/\mkern-6mu/} QS \qquad (eq.\ 1)$$

where COEF is an unquantized coefficient, QS is a quantization step size and Q_COEF is a quantized coefficient.

Inverse quantization, or dequantization, comprises multiplying a quantized coefficient by a quantization step size, and is described by the following equation:

$$COEF\_RECON = Q\_COEF \times QS \qquad (eq.\ 2)$$

where COEF_RECON is a reconstructed coefficient.

The noise introduced by quantization is the difference between the unquantized coefficient COEF and the reconstructed coefficient COEF_RECON, $$Q\_NOISE = |COEF\_RECON - COEF|$$

When the unquantized coefficient COEF is greater than or equal to half of the quantization step size QS/2, COEF≧QS/2, the quantization noise Q_NOISE comprises equiprobable values in the range 0 to QS/2. The mean value of the quantization noise is, therefore, QS/4. Thus, for suitably large coefficients, the average noise is a function of the quantization step size QS.

When the unquantized coefficient COEF is less than half of the quantization step size QS/2, COEF<QS/2, the quantized coefficient Q_COEF is always zero. Therefore, the reconstructed coefficient COEF_RECON is also zero, and the quantization noise Q_NOISE is equal to the unquantized coefficient COEF, Q_NOISE=|0−COEF|=COEF.

The quantization noise is referred to herein as "saturated" when the quantization step size satisfies COEF<QS/2.

Generally, the quantization noise increases with an increase in the quantization step size. However, when the unquantized coefficient is a multiple of the quantization step size, the quantization noise becomes zero for that quantization step size. For example, the following table shows an example of the quantization noise as a function of an increasing quantization step size.

| COEF | QS | Q_COEF | COEF_RECON | Q_NOISE |
|------|----|--------|------------|---------|
| 10 | 2 | 5 | 10 | 0 |
| 10 | 3 | 3 | 9 | 1 |
| 10 | 4 | 3 | 12 | 2 |
| 10 | 5 | 2 | 10 | 0 |
| 10 | 6 | 2 | 12 | 2 |
| 10 | 7 | 1 | 7 | 3 |
| 10 | 8 | 1 | 8 | 2 |
| 10 | 9 | 1 | 9 | 1 |
| 10 | 10 | 1 | 10 | 0 |
| 10 | 11 | 1 | 11 | 1 |
| 10 | 12 | 1 | 12 | 2 |
| 10 | 13 | 1 | 13 | 3 |
| 10 | 14 | 1 | 14 | 4 |
| 10 | 15 | 1 | 15 | 5 |
| 10 | 16 | 1 | 16 | 6 |
| 10 | 17 | 1 | 17 | 7 |
| 10 | 18 | 1 | 18 | 8 |
| 10 | 19 | 1 | 19 | 9 |
| 10 | 20 | 1 | 20 | 10 |
| 10 | 21 | 0 | 0 | 10 |

The root mean square noise NRMS for a block of coefficients is fundamentally proportional to the quantization step size, until the quantization noise saturates at COEF<QS/2. When the quantization noise is saturated for all coefficients in a block, NRMS is set to a constant value.

Figure 8A:
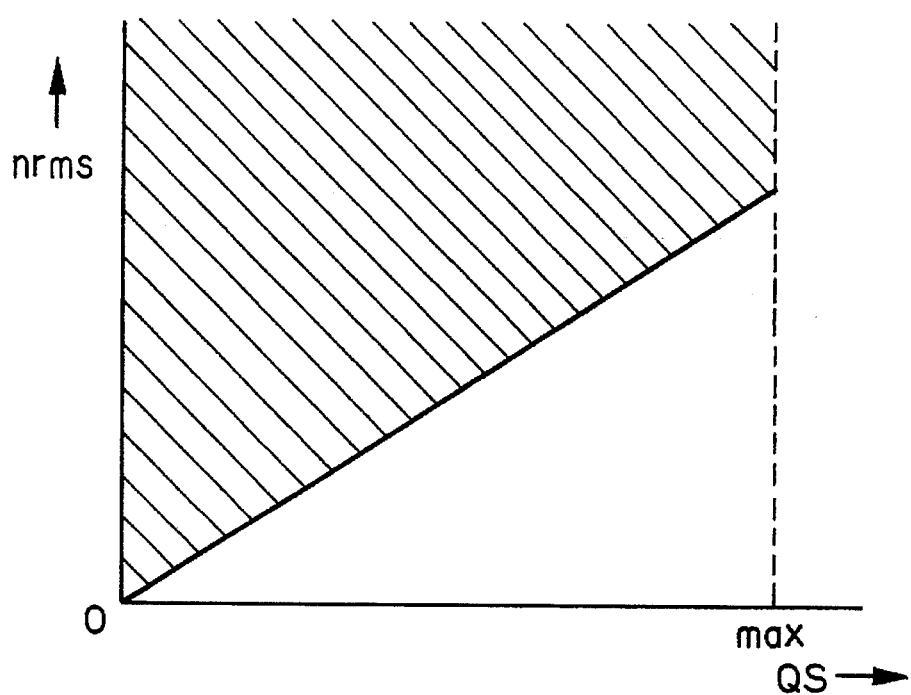
FIGS. 8A and 8B are graphs illustrating unsaturated quantization noise.
Figure 8B:
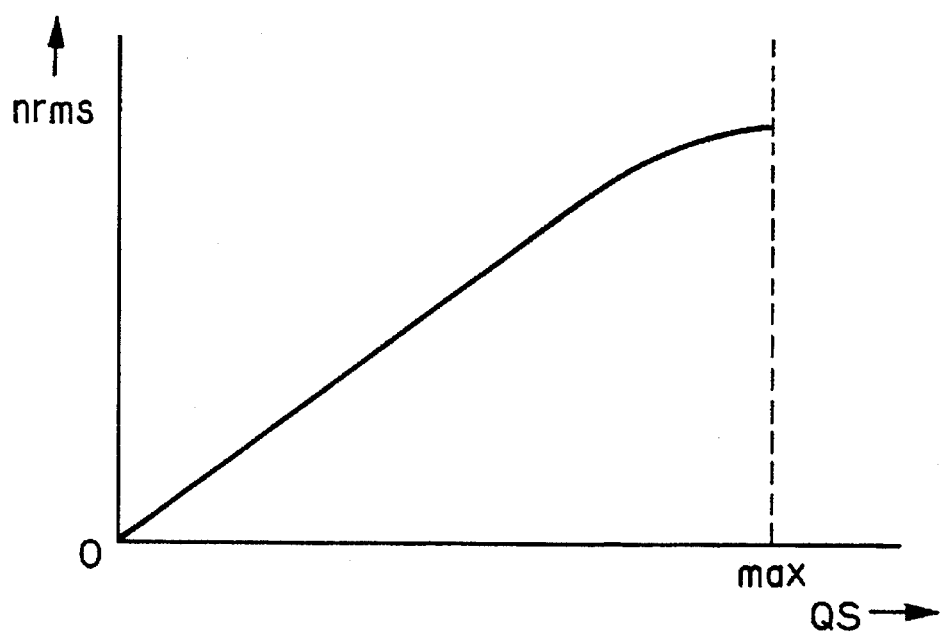
Figure 9A:
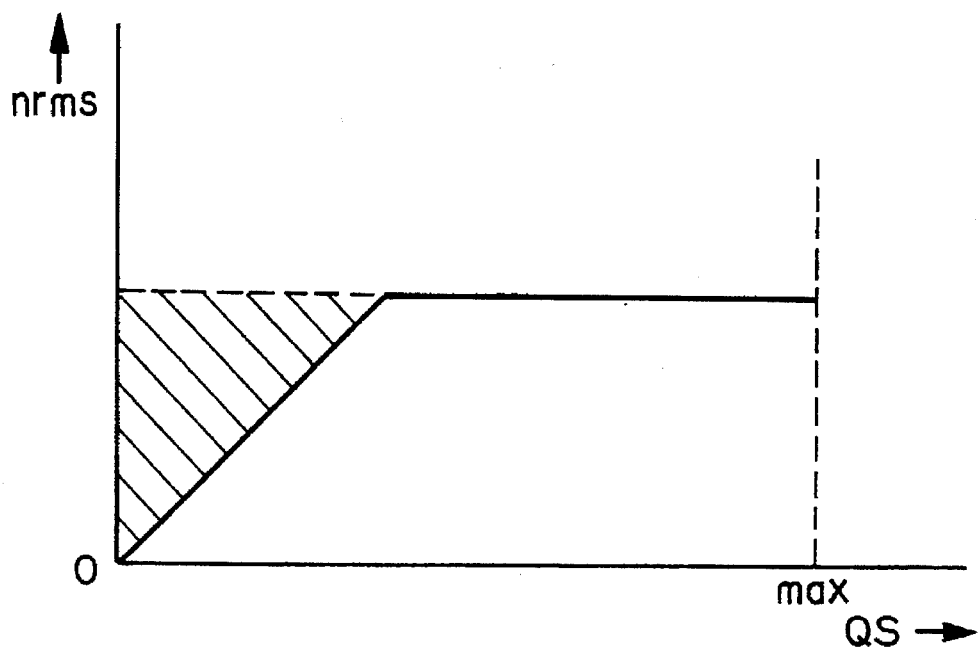
FIGS. 9A and 9B are graphs illustrating saturated quantization noise.

FIGS. 8A and 9A show relationships between the quantization step size QS (abscissa) and the root mean square noise for a coefficient block NRMS (ordinate). Assuming a maximum quantization step size QS_MAX, FIG. 8A shows the case where saturation of NRMS does not occur for a quantization step size up to the maximum quantization step size, $QS \leq QS\_MAX$. The possible range of NRMS is the shaded portion of FIG. 8A. However, almost all of the values of NRMS are located on the curve shown in FIG. 8B. Generally, FIG. 8B shows the case where when the quantization scale QS is increased, NRMS increases almost proportionally thereto. The quantization scale reaches its maximum value at or before saturation of NRMS.

Figure 9B:
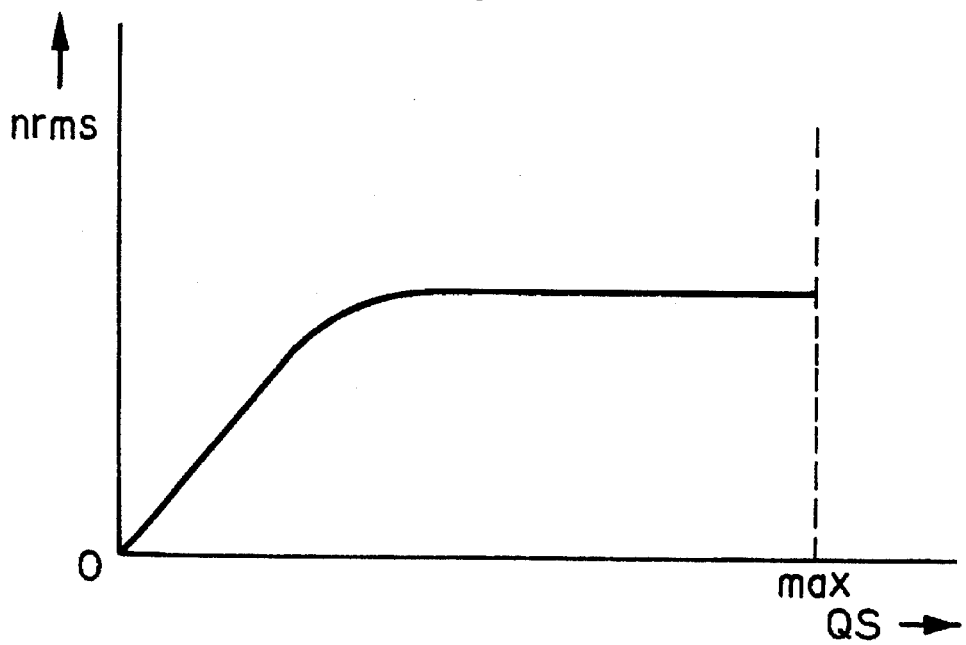

FIG. 9A shows the case where saturation of NRMS occurs before the quantization step size QS reaches the maximum quantization step size QS_MAX. The possible range of NRMS is the shaded portion of FIG. 9A. However, almost all of the values of NRMS are located on the curve shown in FIG. 9B. Generally, FIG. 9B shows the case where as the quantization scale QS is increased, NRMS saturates before the quantization scale QS reaches its maximum value.

The minimum value of the quantization step size at which saturation of NRMS occurs is referred to herein as the saturation quantization step size.

In MPEG 2, the maximum value of the quantization step size QS_MAX is 31.

QUANTIZATION OF COEFFICIENTS IN MPEG 2

Although MPEG 2 provides for a linear quantization scale and a nonlinear quantization scale, only the case of a linear quantization scale will be discussed.

In MPEG 2, the DC coefficient of an intra-macro block (I picture) is quantized with one of four step sizes (8, 4, 2, 1) in accordance with a required accuracy as follows:

$$QDC = dc // Q\_dc \quad (eq. 3)$$

where dc is an unquantized intra-macro block DC coefficient, Q_dc is one of the four quantization step sizes discussed above and QDC is a quantized intra-macro block DC coefficient.

In MPEG 2, the AC coefficients of an intra-macro block are quantized with respective quantization step sizes shown in the quantization step size matrix wI(i,j) of FIG. 6 as follows:

$$q\_ac(i,j) = (16 \times ac(i,j))//wI(i,j) \quad (eq. 4)$$

where ac(i,j) denotes the unquantized intra-macro block AC coefficients and q_ac(i,j) denotes intermediate quantized intra-macro block AC coefficients.

The intermediate intra-macro block AC coefficients q_ac (i,j) are limited to a value within a range from −2048 to 2047, and are further quantized by the quantization step size QS obtained for each macro block as follows:

$$QAC(i,j) = (q\_ac(i,j) + \text{sign}(q\_ac(i,j)) \times ((3 \times QS)//4))/(2 \times QS) \quad (eq. 5)$$

where QAC(i,j) denotes the quantized intra-macro block AC coefficients. In accordance with the value of an MPEG 2 parameter, tcoef-escape-flag, the coefficients QAC(i,J) are limited to a value within a range from −255 to 255 when tcoef-escape-flag is equal to 0 and to a value within a range from −2047 to 2047 when tcoef-escape-flag is equal to 1.

In MPEG 2, the DC and AC coefficients of a non-intra-macro block (P or B picture) are quantized by the same method using the quantization matrix wN(i,j) of FIG. 7. The quantization result QAC(i,j) is calculated according to the following equations:

$$q\_ac(i,j) = (16 \times ac(i,j))//wN(i,j) \quad (eq. 6)$$

$$QAC(i,j) = q\_ac(i,j)/(2 \times QS) \quad (eq. 7)$$

In the intra-macro block, the inverse quantization of the DC coefficient is obtained as follows:

$$dct\_recon(0,0) = Q\_dc \times QDC \quad (eq. 8)$$

where dct_recon(0,0) is the reconstructed DC coefficient, also referred to as the dequantized DC coefficient.

In the intra-macro block, the inverse quantization of the AC coefficient is obtained as follows:

$$dct\_recon(i,j) = (QS \times 2 \times QAC(i,j) \times wI(i,j))/16 \quad (eq. 9)$$

where dct-recon(i,j) denotes the reconstructed AC coefficients. When the sum which is calculated by the following equation is equal to an even number, the least significant bit (LSB) in the sign-magnitude representation in dct_recon(7, 7) is inverted:

$$\text{sum} = \sum_{i,j} dct\_recon(i,j) \quad (eq. 10)$$

In the non-intra-macro block, the inverse quantization of the coefficients is obtained as follows:

for $QAC(i,j) > 0$, $$dct\_recon(i,j) = ((2 \times QAC(i,j) + 1) \times QS \times wN(i,j))/16 \quad (eq. 11)$$

for $QAC(i,j) = 0$, $dct\_recon(i,j) = 0$ \quad (eq. 12)

for $QAC(i,j) < 0$,

-continued $$dct\_recon(i,j) = ((2 \times QAC(i,j) - 1) \times QS \times wN(i,j))/16 \quad \text{(eq. 13)}$$

When the sum which is calculated by the following equation is equal to an even number, the least significant bit (LSB) in the sign-magnitude representation in dct_recon(7,7) is inverted:

$$\text{sum} = \sum_{i,j} dct\_recon(i,j) \quad \text{(eq. 14)}$$

QUANTIZATION NOISE CURVE ESTIMATION IN MPEG 2

Prediction of quantization noise using the MPEG 2 Test Model 5 will now be discussed.

Let (a) be the saturation NRMS, (b) be the saturation quantization step size, and the maximum quantization step size QS_MAX be 31.

Figure 10A:
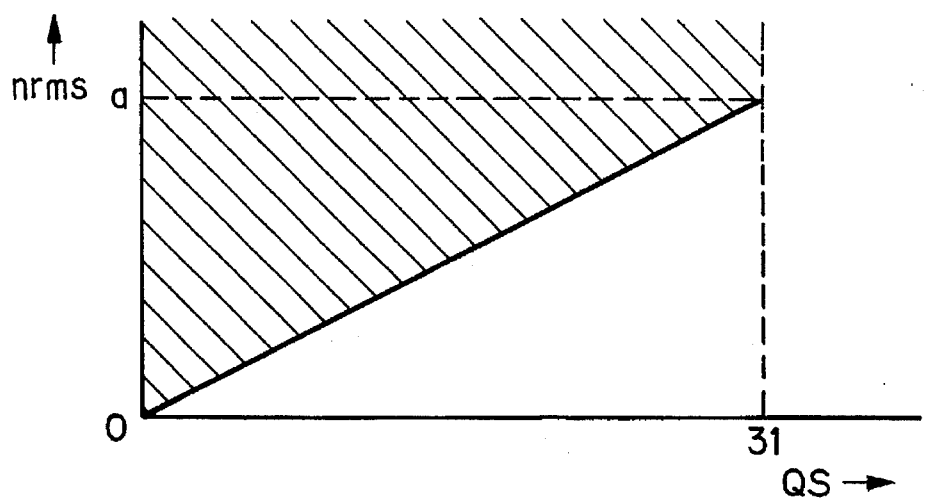
FIGS. 10A–10C are graphs to which reference is made in explaining prediction of a quantization noise curve for unsaturated quantization noise.
Figure 10B:
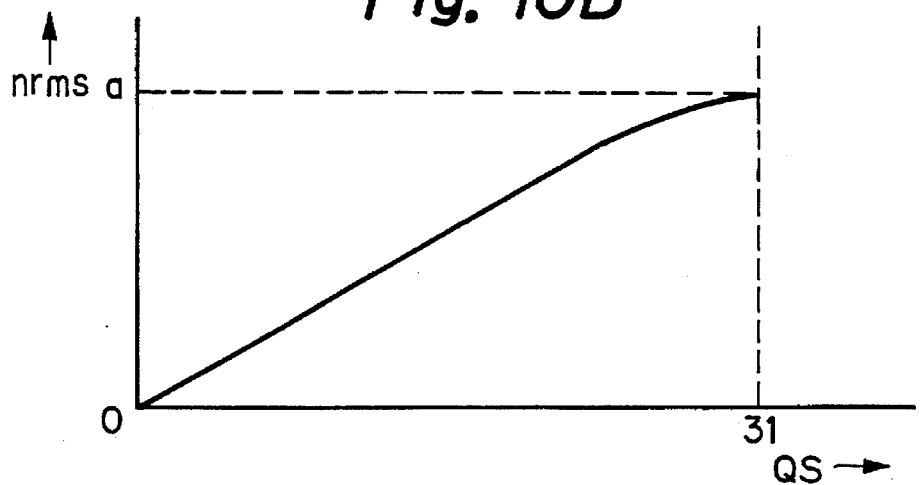

FIG. 10A shows the case where NRMS not saturated until the quantization step size reaches its maximum, that is, (b)=QS_MAX=31. Strictly speaking, even when the quantization step size reaches its maximum, saturation may not occur. However, for convenience, saturation is considered to occur at QS=QS_MAX. FIG. 10B shows the curve on which NRMS is generally located. For simplicity, the NRMS curve is approximated as a straight line curve, as shown in FIG. 10C, which passes through the origin (QS=0, NRMS=0) and the point (QS=31, NRMS=(a)).

Figure 11A:
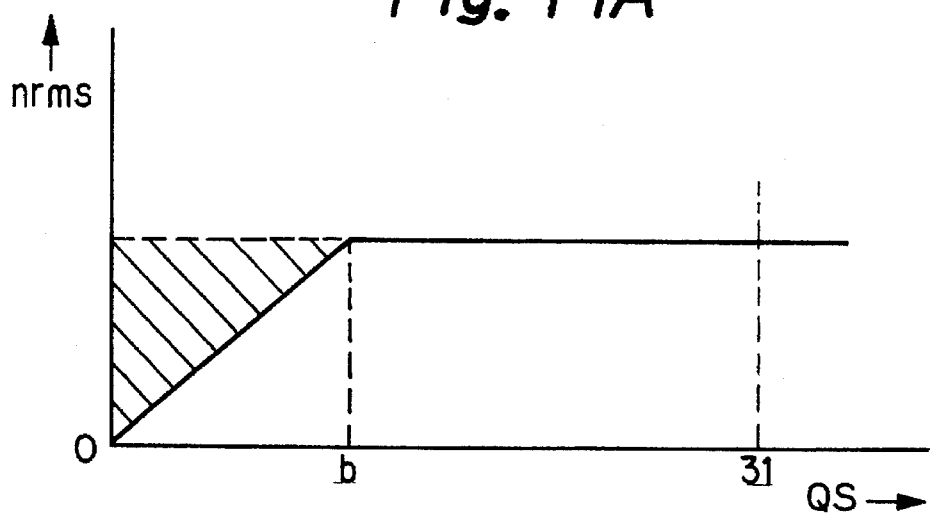
FIGS. 11A–11C are graphs to which reference is made in explaining prediction of a quantization noise curve for saturated quantization noise.
Figure 11B:
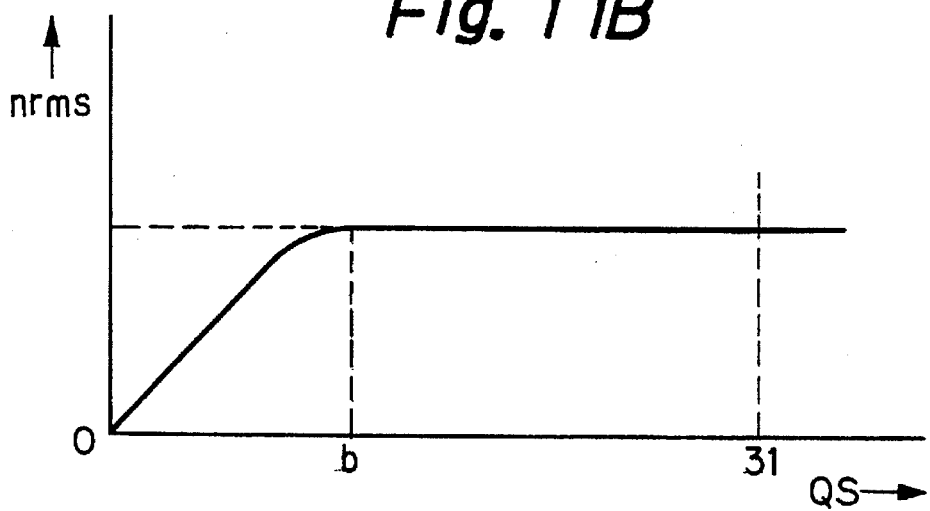

FIG. 11A shows the case where NRMS is completely saturated before the quantization step size reaches its maximum, that is, (b)<QS_MAX. For a quantization step size QS in the range (b) to QS_MAX, NRMS=(a). FIG. 11B shows the curve on which NRMS is generally located. For simplicity, the NRMS curve is approximated as a polygonal curve comprising a straight line curve which passes through the origin (QS=0, NRMS=0) and the point (QS=(b), NRMS=(a)), followed by a constant portion ((b)<Qs<=31, NRMS=(a)).

Figure 10C:
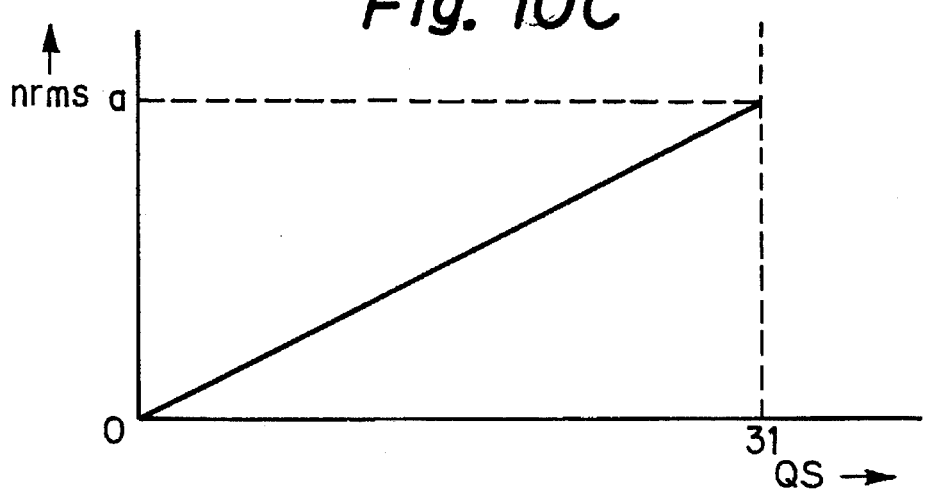
Figure 11C:
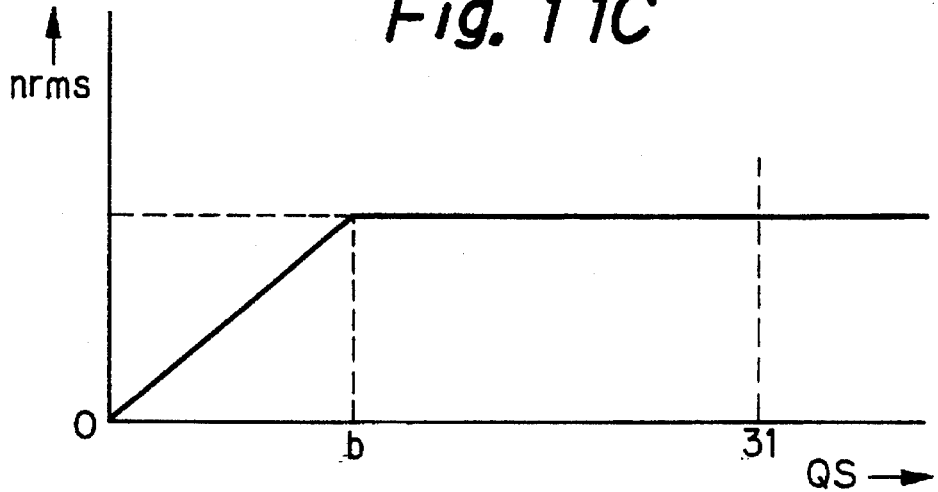

The approximations of FIG. 10C and 11C both include the point (QS=31, NRMS=(a)).

The quantization noise curve is estimated as follows.

First, the saturation quantization step size (b) is predicted. If (b)>QS_MAX, then (b) is limited to QS_MAX=31.

Next, the saturation NRMS (a) at QS=QS_MAX is predicted.

In the range where QS<(b), the quantization noise curve is approximated by a straight line connecting the origin (QS=0, NRMS=0) and the point (Qs=(b), NRMS=(a)). If (b)=QS_MAX, there is no need to continue.

If (b)<QS_MAX, then in the range where QS>(b), the quantization noise curve is approximated by a constant (NRMS=(a)).

Thus, to approximate the quantization noise curve in MPEG 2, only the saturation NRMS (a) and the saturation quantization step size (b) are needed.

The signal to noise ratio (SNR) is defined as follows:

$$SNR = 20 \log (255/NRMS) \quad \text{(eq. 15)}$$

PREDICTING THE SATURATION NRMS (a)

A procedure for estimating the saturation NRMS (a) at the maximum quantization step size QS_MAX will now be described. Generally, the procedure is to approximately calculate the portion of each coefficient in a block which will be lost (omitted) by quantization, to sum the lost portions in the block and to multiply the sum by a constant found from, for example, statistical observation of encoding sequences. The multiplied sum is the prediction of the saturation NRMS (a).

For an intra-macro block, quantization is approximated as follows, from equations (4) and (5):

$$QAC(i,j) = (16 \times ac(i,j))/(wI(i,j) \times 2 \times 31) \quad \text{(eq. 16)}$$

The portion of each coefficient in an intra-macro block which will be lost by quantization when QS=QS_MAX=31 is approximated as follows:

$$rmdI(i,j) = dc \% 8, \ (i,j) = (0,0) \quad \text{(eq. 17)}$$

$$rmdI(i,j) = (16 \times ac(i,j)) \% (wI(i,j) \times 2 \times 31), \ (i,j) \neq (0,0) \quad \text{(eq. 18)}$$

where dc=ac(0,0) and it is assumed that Q_dc=8. During encoding, it is possible to accommodate Q_dc selected from (4, 2, 1). The sum of the coefficient portions lost during quantization of an intra-macro block is defined as follows:

$$P1I = \sum_{i=0}^{7} \sum_{j=0}^{7} |rmdI(i,j)| \quad \text{(eq. 19)}$$

The multiplier constant should be obtained by statistics of the relationship between P1I and NRMS for a source image being encoded. For an MPEG test sequence, the intra-macro block constant is as follows:

$$cI = 1/(903.297) \quad \text{(eq. 20)}$$

For an intra-macro block, the saturation NRMS is predicted from (a)=cI×P1I.

For a non-intra-macro block, quantization is approximated as follows, from equations (6) and (7):

$$QAC(i,j) = (16 \times ac(i,j))/(wN(i,j) \times 2 \times 31) \quad \text{(eq. 21)}$$

The portion of each coefficient in a non-intra-macro block which will be lost by quantization when QS=QS_MAX=31 is approximated as follows:

$$rmdN(i,j) = (16 \times ac(i,j)) \% (wN(i,j) \times 2 \times 31) \quad \text{(eq. 22)}$$

The sum of the coefficient portions lost during quantization of a non-intra-macro block is defined as follows:

$$P1N = \sum_{i=0}^{7} \sum_{j=0}^{7} |rmdN(i,j)| \quad \text{(eq. 23)}$$

The multiplier constant should be obtained by statistics of the relationship between P1N and NRMS for a source image being encoded. For an MPEG test sequence, the non-intra-macro block constant is as follows:

$$cN = 1/(734.522) \quad \text{(eq. 24)}$$

For a non-intra-macro block, the saturation NRMS is predicted from (a)=cN×P1N.

PREDICTING THE SATURATION QUANTIZATION STEP SIZE (b)

A procedure for estimating the saturation quantization step size (b) will now be described. Generally, the procedure is to find the minimum quantization step size which results in the quantized AC coefficients for a block having values of zero, and to use this minimum quantization step size as the prediction of the saturation quantization step size.

For an intra-macro block AC coefficient ac(i,j), the minimum quantization step size MIN_QSI(i,j) which results in the quantized AC coefficient QAC(i,j) having a value of zero is found from the following, based on equations (4) and (5):

$$QAC(i, j) = (((16 \times ac(i, j))/wI(i, j)) + ((3 \times QS)/4))/(2 \times QS) \quad \text{(eq. 25)}$$

The quantized coefficient QAC(i,j) will be zero when:

$$1 > (((16 \times ac(i, j))/wI(i, j)) + ((3 \times QS)/4))/(2 \times QS) \quad \text{(eq. 26)}$$

Rearranging terms, $$QS > (64 \times ac(i, j))/(5 \times wI(i, j)) \quad \text{(eq. 27)}$$

The minimum integer quantization step size which satisfies equation (27) is $$MIN+\_QSI(i, j) = (64 \times ac(i, j))/(5 \times wI(i, j)) + 1 \quad \text{(eq. 28)}$$

Similarly, the minimum integer quantization step size which satisfies equation (27) when ac(i,j)<0 is $$MIN-\_QSI(i, j) = -(64 \times ac(i, j))/(5 \times wI(i, j)) + 1 \quad \text{(eq. 29)}$$

When ac(i,j)=0, the quantization result is always equal to 0. However, since the possible quantization step size range is 1 to 31, the minimum integer quantization step size is 1, MIN0_QSI(i,j)=1. Summarizing, the minimum quantization step size MIN_QSI is found from $$MIN\_QSI(i, j) = |(64 \times ac(i, j))/(5 \times wI(i, j))| + 1 \quad \text{(eq. 30)}$$

For all of the AC coefficients in an intra-macro block, the minimum quantization step size P2I at which all quantized AC coefficients in the block have a value of zero is $$P2I = \max(MIN\_QSI(i, j)), (i, j) \neq 0 \quad \text{(eq. 31)}$$

For an intra-macro block, the saturation quantization step size is predicted from (b)=P2I.

For a non-intra-macro block, in a manner similar to the intra-macro block, the above-described prediction procedure is applied to equations (6) and (7) to obtain the minimum quantization step size P2N at which all quantized coefficients in the block have a value of zero:

$$P2N = \max(|(8 \times ac(i, j))/wN(i, j)| + 1), 0 \leq i \leq 7, 0 \leq j \leq 7 \quad \text{(eq. 32)}$$

For a non-intra-macro block, the saturation quantization step size is predicted from (b)=P2N.

Operation of the noise estimating circuit 15 shown in FIG. 4 will now be described.

The noise estimating circuit 15 comprises input terminal 50, switch 54, saturation noise estimating circuits 51A, 51B, multipliers 52A, 52B, saturation quantization step size estimating circuits 53A, 53B, quantization noise curve predicting circuit 55 and output terminal 56.

Blocks of coefficient data are supplied from DCT circuit 1 of FIG. 2 to input terminal 50 of FIG. 4, which supplies the blocks to switch 54. Switch 54 is operative in accordance with a control signal (not shown) to supply intra-macro blocks to terminal 54A and to supply non-intra macro blocks to terminal 54B.

Saturation noise estimating circuit 51A and saturation quantization step size estimating circuit 53A are coupled to switch terminal 54A, and are adapted to receive intra-macro blocks therefrom. The circuits 51A, 53A are also adapted to receive the quantization matrix wI shown in FIG. 6.

The saturation noise estimating circuit 51A functions to calculate the value P1I as described above, and to supply the value P1I to multiplier 52A, which is adapted to multiply the value P1I by an intra-macro block constant cI, as described above, to produce a predicted saturation NRMS (a), and to supply the predicted value (a) to quantization noise curve predicting circuit 55.

The saturation quantization step size estimating circuit 53A functions to calculate the value P2I as described above, and to supply the value P2I as a predicted saturation quantization step size (b) to quantization noise curve predicting circuit 55.

Saturation noise estimating circuit 51B and saturation quantization step size estimating circuit 53B are coupled to switch terminal 54B, and are adapted to receive non-intra-macro blocks therefrom. The circuits 51B, 53B are also adapted to receive the quantization matrix wN shown in FIG. 7.

The saturation noise estimating circuit 51B functions to calculate the value P1N as described above, and to supply the value P1N to multiplier 52B, which is adapted to multiply the value P1N by an intra-macro block constant cN, as described above, to produce a predicted saturation NRMS (a), and to supply the predicted value (a) to quantization noise curve predicting circuit 55.

The saturation quantization step size estimating circuit 53B functions to calculate the value P2N as described above, and to supply the value P2N as a predicted saturation quantization step size (b) to quantization noise curve predicting circuit 55.

The quantization noise curve predicting circuit 55 functions to estimate a quantization noise curve in accordance with the procedure described above, and to supply the result to output terminal 56.

Operation of the quantization control circuit 8 shown in FIG. 5 will now be described.

Figure 5:
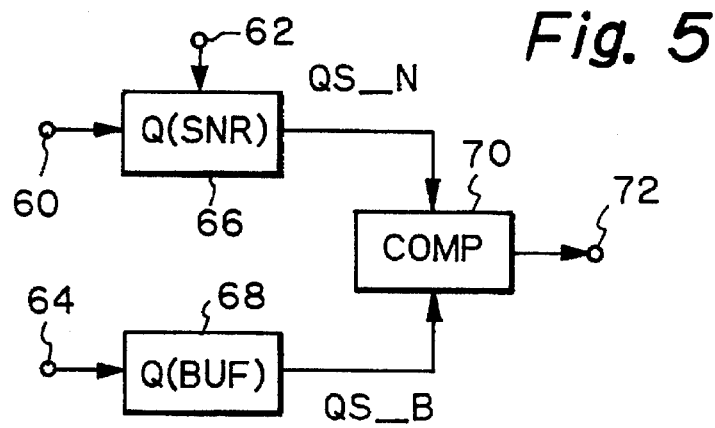
FIG. 5 is a block diagram of a quantization step size control circuit according to the present invention.

The estimated quantization noise curve is supplied from the noise estimating circuit 15, shown in FIGS. 2 and 4, to input terminal 60 of the quantization control circuit 8 shown in FIG. 5 which supplies the estimated curve to first quantization step size circuit 66. A minimum NRMS value (A) is supplied to input terminal 62 and thence to first quantization step size circuit 66. The value (A) is obtained from a desired SNR and equation (15).

The first quantization step size circuit 66 uses the predicted noise curve and the specified minimum NRMS value (A) to generate a first quantization step size QS_N and supplies the step size QS_N to comparator 70.

Figure 12A:
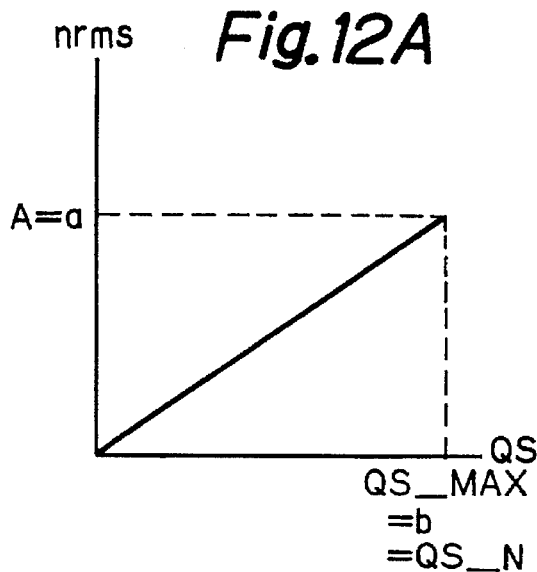
FIGS. 12A–12D are graphs to which reference is made in explaining selection of a quantization step size with respect to the predicted quantization noise curve and a specified SNR.
Figure 12B:
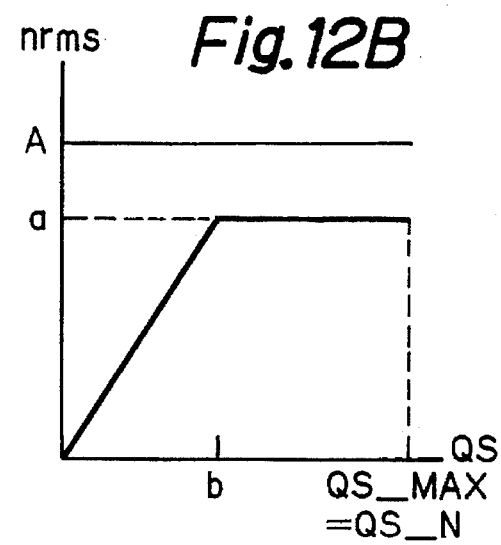

Generation of the step size QS_N will be explained with reference to FIGS. 12A–12D. First, the circuit 66 determines whether the minimum NRMS value (A) is less than the saturation NRMS value (a). If not, that is, (A)≧(a), as shown in FIGS. 12A and 12B, the step size QS_N is set to QS_MAX=31. Actually, in the case of FIG. 12B, the step size QS_N may be selected anywhere in the range (b) to QS_MAX.

Figure 12C:
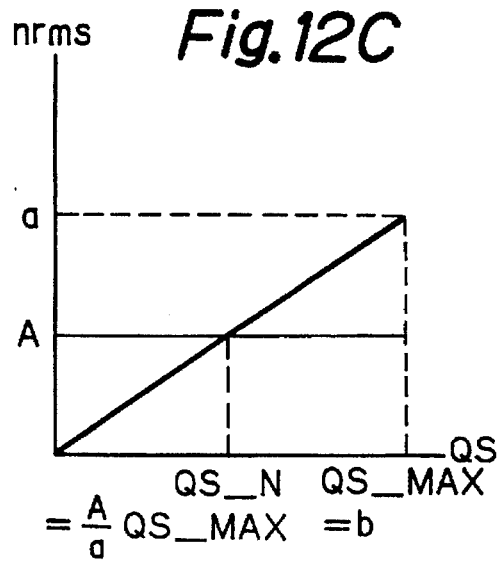
Figure 12D:
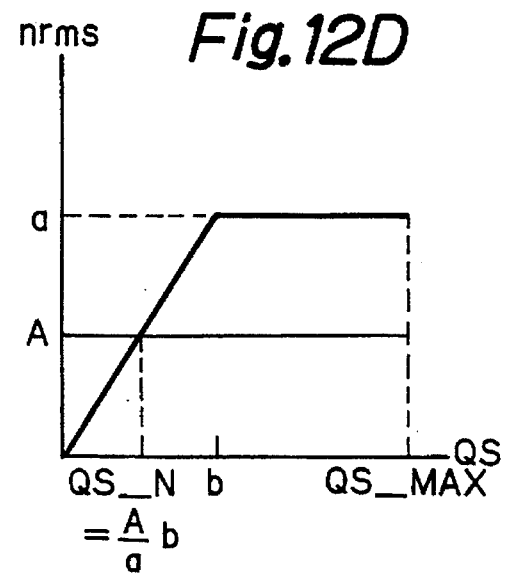

When (A)<(a), then QS_N is set to (A/a)×(b). If (b)= QS_MAX, as shown in FIG. 12C, then QS_N is set to (A/a)×QS_MAX. If (b)<QS_MAX, as shown in FIG. 12D, then QS_N is set to (A/a)×(b). In either of these cases, if rounding is required, QS_N is rounded UP to the nearest integer.

A buffer occupancy value (B) is supplied from buffer occupancy detecting circuit 17 of FIG. 2 or from buffer occupancy estimating circuit 17A of FIG. 3 to input terminal 64 of the quantization control circuit 8 shown in FIG. 5. The buffer occupancy (B) may be, for example, simply the percent of buffer capacity occupied by encoded data awaiting transmission, that is, (B)=D/Y, where D is the amount of encoded data awaiting transmission and Y is the capacity of the buffer. The input terminal 64 supplies the buffer occupancy to second quantization step size circuit 68.

The second quantization step size circuit 68 uses the buffer occupancy (B) to generate a second quantization step size QS_B and supplies the step size QS_B to comparator 70. For example, the step size QS_B may be the product of the buffer occupancy and the maximum quantization step size, QS_B=(B)×(QS_MAX). Several methods are set forth in the MPEG Test Models for determining QS_B.

Comparator 70 is operative to receive the first and second quantization step sizes QS_N, QS_B, to select the larger for use in actual quantization of a coefficient data block, and to supply the selected step size to output terminal 72.

Thus, the quantization control circuit 8 maximizes the value of the SNR of the video image and prevents the buffer memory from overflowing. Since the selected quantization step size is always at least QS_B, an overflow never occurs.

When a coefficient block representing a lot of information is followed by a coefficient block representing little information, reconstructed image quality is improved by limiting a maximum value of the SNR of the block representing little information. Such limiting corresponds to allocating extra buffer space to the block representing a lot of information. That is, perceived image quality is thought to be improved more by reducing quantization noise in the block representing a lot of information than by reducing quantization noise in the block representing little information.

If encoding can be performed without considering the buffer occupancy, then QS_N becomes the selected quantization step size, and the SNR of the image becomes generally constant.

According to the present invention, since the quantization noise can be estimated, the quantization step size can be selected together with the buffer occupancy in accordance with the SNR. That is, for example, the quantization can be performed to make the SNR substantially constant. In case of using the same code rate as in the prior art, therefore, a reconstructed picture is stable and a higher quality is obtained.

With the quantization noise estimating method according to the present invention, since the quantization noise can be estimated before the quantization is actually performed, the noise estimating circuit can be easily constructed and the optimum quantization step size can be easily selected.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A quantization control apparatus comprising:
   quantization noise curve estimating means for estimating a quantization noise curve by determining quantization noise as a function of a quantization step size for a block of image data and limiting said quantization noise curve to a quantization step size which becomes saturated such that said quantization noise is a maximum for larger values of said quantization step size; and
   selecting means for selecting an actual quantization step size in accordance with the estimated quantization noise curve such that said actual quantization step size is not saturated.

2. The apparatus of claim 1, wherein said quantization noise curve estimating means includes:
   means for predicting a saturation quantization noise value at which point the quantization noise is a maximum;
   means for predicting a saturation quantization step size corresponding to said saturation quantization noise value; and
   means for predicting said estimated quantization noise curve in accordance with said saturation quantization noise value and said saturation quantization step size.

3. The apparatus of claim 2, wherein said means for predicting is operative to predict said estimated quantization noise curve as a straight line when said saturation quantization step size is a maximum quantization step size, and to predict said estimated quantization noise curve as a polygonal line when said saturation quantization step size is less than said maximum quantization step size.

4. The apparatus of claim 2, wherein said means for predicting a saturation quantization noise value is operative to approximately calculate the portions of said block of image data which will be lost by quantization, to sum the lost portions in said block of image data and to multiply the sum by a constant.

5. The apparatus of claim 2, wherein said means for predicting a saturation quantization step size is operative to find a minimum quantization step size which results in quantized image data for said block of image data having values of zero.

6. The apparatus of claim 1, wherein said selecting means is operative to select said actual quantization step size also in accordance with a buffer occupancy of a buffer which stores quantized image data.

7. The apparatus of claim 6, wherein said selecting means includes:
   first means for generating a first quantization step size in accordance with said estimated quantization noise curve;
   second means for generating a second quantization step size in accordance with said buffer occupancy; and
   third means for selecting a larger of said first and second quantization step sizes as said actual quantization step size.

8. The apparatus of claim 7, wherein said first means is operative to generate said first quantization step size also in accordance with a specified noise.

9. The apparatus of claim 8, wherein said first means is operative to generate said first quantization step size as a maximum quantization step size when $A \geq a$, and to generate said first quantization step size as $(A/a) \times (b)$ when $A < a$, where
   A is said specified noise,
   a is a saturation noise value, and
   b is a saturation quantization step size.

10. A quantization control method comprising the steps of:
    estimating a quantization noise curve by determining quantization noise as a function of a quantization step size for a block of image data and limiting said quantization noise curve to a quantization step size which becomes saturated such that said quantization noise is a maximum for larger values of said quantization step size; and
    selecting an actual quantization step size in accordance with the estimated quantization noise curve such that said actual quantization step size is not saturated.

11. The method of claim 10, wherein said step of estimating includes:

predicting a saturation quantization noise value at which point said quantization noise is a maximum;

predicting a saturation quantization step size corresponding to the saturation quantization noise value; and predicting said estimated quantization noise curve in accordance with said saturation quantization noise value and said saturation quantization step size.

12. The method of claim 11, wherein said step of predicting said estimated quantization noise curve predicts said estimated quantization noise curve as a straight line when said saturation quantization step size is a maximum quantization step size, and predicts said estimated quantization noise curve as a polygonal line when said saturation quantization step size is less than said maximum quantization step size.

13. The method of claim 11, wherein said step of predicting said saturation quantization noise value includes approximately calculating the portions of said block of image data which will be lost by quantization, summing the lost portions in said block of image data and multiplying the sum by a constant.

14. The method of claim 11, wherein said step of predicting a saturation quantization step size includes finding a minimum quantization step size which results in quantized image data for said block of image data having values of zero.

15. The method of claim 10, wherein said step of selecting selects said actual quantization step size also in accordance with a buffer occupancy of a buffer which stores quantized image data.

16. The method of claim 15, wherein said step of selecting includes:

generating a first quantization step size in accordance with said estimated quantization noise curve;

generating a second quantization step size in accordance with said buffer occupancy; and selecting a larger of said first and second quantization step sizes as said actual quantization step size.

17. The method of claim 16, wherein said step of generating a first quantization step size generates said first quantization step size also in accordance with a specified noise.

18. The method of claim 17, wherein said step of generating a first quantization step size includes generating said first quantization step size as a maximum quantization step size when $A \geq a$, and generating said first quantization step size as $(A/a) \times (b)$ when $A < a$, where A is said specified noise, a is a saturation noise value, and b is a saturation quantization step size.

19. An encoding apparatus comprising:

quantization noise curve estimating means for estimating a quantization noise curve by determining quantization noise as a function of a quantization-step size for a block of image data and limiting said quantization noise curve to a quantization step size which becomes saturated such that said quantization noise is a maximum for larger values of said quantization step size;

selecting means for selecting an actual quantization step size in accordance with the estimated quantization noise curve such that said actual quantization step size is not saturated; and quantizing means for quantizing said block of image data using said actual quantization step size.

* * * * *